US012689695B2

(12) United States Patent
Sato et al.

(10) Patent No.: US 12,689,695 B2
(45) Date of Patent: Jul. 21, 2026

(54) INFORMATION PROCESSING APPARATUS, INFORMATION PROCESSING METHOD, AND NON-TRANSITORY COMPUTER READABLE MEDIUM

(71) Applicant: FUJIFILM Business Innovation Corp., Tokyo (JP)

(72) Inventors: Eri Sato, Kanagawa (JP); Kohei Kaibara, Kanagawa (JP); Aya Kuwano, Kanagawa (JP); Mitsuru Sato, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/180,920

(22) Filed: Mar. 9, 2023

(65) Prior Publication Data

US 2024/0064249 A1    Feb. 22, 2024

(30) Foreign Application Priority Data

Aug. 19, 2022    (JP) ................................. 2022-131308

(51) Int. Cl.
H04N 1/00            (2006.01)

(52) U.S. Cl.
CPC ..... H04N 1/00782 (2013.01); H04N 1/00689 (2013.01); H04N 1/00692 (2013.01); H04N 1/00737 (2013.01)

(58) Field of Classification Search
CPC ........... H04N 1/00782; H04N 1/00689; H04N 1/00692; H04N 1/00737

USPC ......................................................... 358/1.13
See application file for complete search history.

(56) References Cited

U.S. PATENT DOCUMENTS

| | | | |
|---|---|---|---|
| 2012/0237079 A1* | 9/2012 | Hanyu | G06T 1/005 382/100 |
| 2013/0182293 A1* | 7/2013 | Okada | H04N 1/00355 358/450 |
| 2021/0105376 A1* | 4/2021 | Maruyama | H04N 1/00427 |

FOREIGN PATENT DOCUMENTS

JP        2013-161425 A        8/2013

* cited by examiner

*Primary Examiner* — Gabriel I Garcia
(74) *Attorney, Agent, or Firm* — Oliff PLC

(57)        ABSTRACT

An information processing apparatus includes a processor configured in which an area to be processed in a document is specified using a position of a marker placed on a surface of the document. When the marker is placed, the processor uses a placement position of the marker to specify the area to be processed and register area information indicating the area to be processed. When the marker is not placed and the area information is registered, the processor executes predetermined processing with respect to the area to be processed that is indicated by the area information. When the marker is not placed and the area information is not registered, if the area information is registered after a predetermined area of the document is registered as a target, the processor specifies the area to be processed as indicated by the area information as the area to be targeted by the processing.

11 Claims, 15 Drawing Sheets

FIG. 5

| MARKER TYPE | PLACEMENT METHOD | MARKER ID | PROCESSING CONTENT |
|---|---|---|---|
| AREA SPECIFICATION | ENCLOSE | A01 | TRIM |
| | | A02 | MASK |
| | | ⋮ | ⋮ |
| | ENCLOSE OR SPECIFY LINE | B01 | OCR, FILE NAME |
| | | B02 | OCR, FOLDER NAME |
| | | ⋮ | ⋮ |
| | ⋮ | ⋮ | ⋮ |
| EXECUTION PROCESS SPECIFICATION | PLACE FREELY | H01 | EMAIL ATTACHMENT |
| | | H02 | EMAIL NOTIFICATION |
| | | H02 | PRINT |
| | | ⋮ | ⋮ |
| | ⋮ | ⋮ | ⋮ |
| SCAN SETTING | PLACE FREELY | M01 | NEXT DOCUMENT Y/N |
| | | M02 | SPECIFY PAGE |
| | | ⋮ | ⋮ |
| DOCUMENT PROCESSING | PLACE FREELY | R01 | HIGHLIGHT ENTIRE PAGE IN LINKED SERVICE PROVIDED BY OTHER COMPANY |
| | | ⋮ | ⋮ |
| ⋮ | ⋮ | ⋮ | ⋮ |

| PROCESSING CONTENT | SET VALUE |
|---|---|
| MASK | (X1, Y1) – (X2, Y2) |
| EMAIL ATTACHMENT | SERVER A |
| ⋮ | ⋮ |

FIG. 12
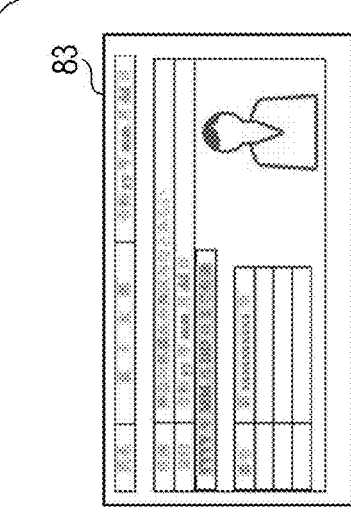
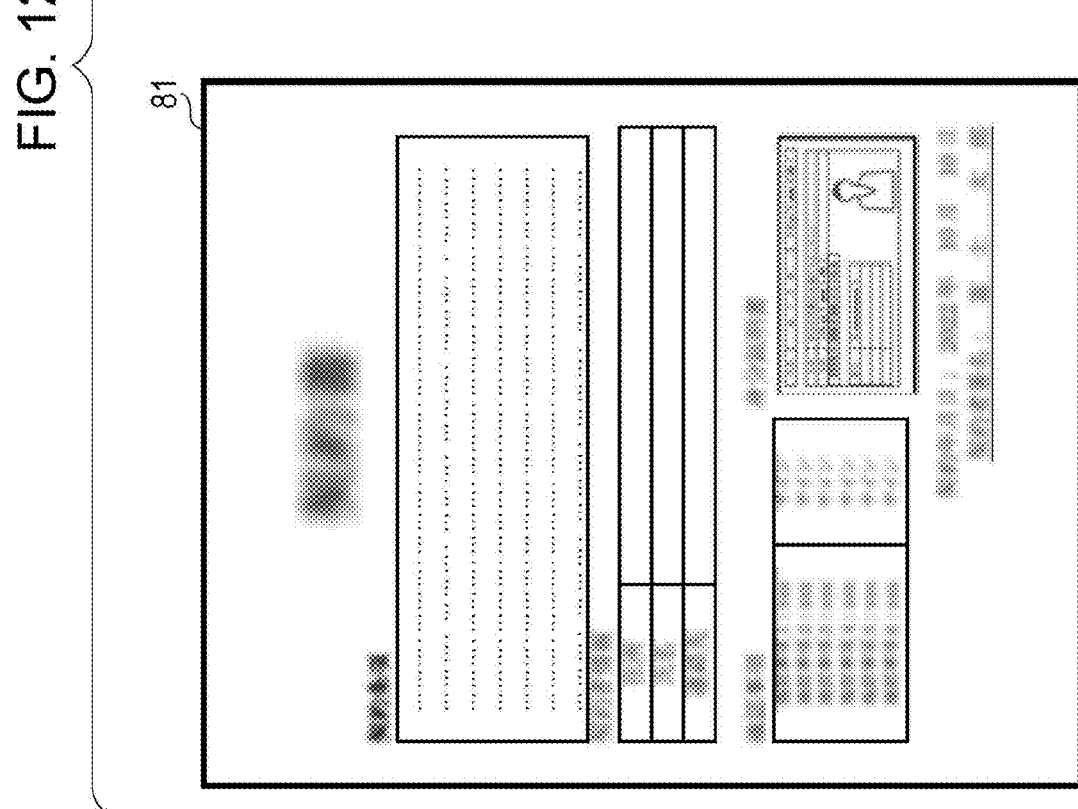

DOCUMENT CAMERA
IMAGE CAPTURE AREA

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-131308 filed Aug. 19, 2022.

BACKGROUND

(i) Technical Field

The present disclosure relates to an information processing apparatus, an information processing method, and a non-transitory computer readable medium.

(ii) Related Art

The following is one technology related to specifying an area to be processed in a document.

Japanese Unexamined Patent Application Publication No. 2013-161425 discloses a trimming program for a mobile phone, in which the trimming program is installable in a mobile phone including a camera, a processor that processes data obtained by image capture, and a memory, and in which the program processes photographic data obtained by using the camera to capture an image of an area on a document enclosed by a rectangular virtual frame formed by placing four markers indicating the desire to save the area as an image, together with the four markers.

The trimming program for a mobile phone includes a step of automatically detecting the four markers from the photographic data and a step of generating image data by automatically trimming, from the photographic data, the rectangular area demarcated by the detected four markers.

SUMMARY

However, the above technology is problematic in that if information such as characters or figures is obscured underneath the placement positions of the markers in the document, that information will be lost.

Aspects of non-limiting embodiments of the present disclosure relate to avoiding the loss of information located underneath markers in the case in which markers are used to specify an area to be processed in a document.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured such that, in a situation in which an area to be processed in a document is specified using a position of a marker placed on a surface of the document, in a case in which the marker is placed on the surface of the document, the processor is configured to use a placement position of the marker to specify the area to be processed and register area information indicating the area to be processed; in a case in which the marker is not placed on the surface of the document and the area information is registered, the processor is configured to execute predetermined processing with respect to the area to be processed that is indicated by the area information; and in a case in which the marker is not placed on the surface of the document and the area information is not registered, if the area information is registered after a predetermined area on the surface of the document is registered as a target, the processor is configured to specify the area to be processed that is indicated by the area information as the area to be targeted by the processing.

BRIEF DESCRIPTION OF THE DRAWINGS

An exemplary embodiment of the present disclosure will be described in detail based on the following figures, wherein:

FIG. 5 is a schematic diagram illustrating an example of the structure of a marker-related information database according to the exemplary embodiment;

FIG. 6 is a schematic diagram illustrating an example of the structure of a process-related information database according to the exemplary embodiment;

FIG. 12 is a diagram provided to explain a specific case of a situation handleable by information processing according to the exemplary embodiment, and illustrates an example of an expected processing state;

DETAILED DESCRIPTION

Hereinafter, an exemplary embodiment of the present disclosure will be described in detail and with reference to the drawings. Note that the present exemplary embodiment describes an example in which an information processing apparatus according to the technology of the present disclosure is applied to an image processing apparatus which is set up in an office and which includes a document camera. However, the technology of the present disclosure is not limited to being applied to an office setting and may also be applied to any place where an image processing apparatus could be installed, such as at a school or inside the home. Moreover, the technology of the present disclosure is not limited to being applied to an image processing apparatus and may also be applied to any apparatus that executes some kind of processing with respect to a multi-page document, such as an image reading apparatus that reads images or an image transmission apparatus that transmits read images to another apparatus.

Figure 1:
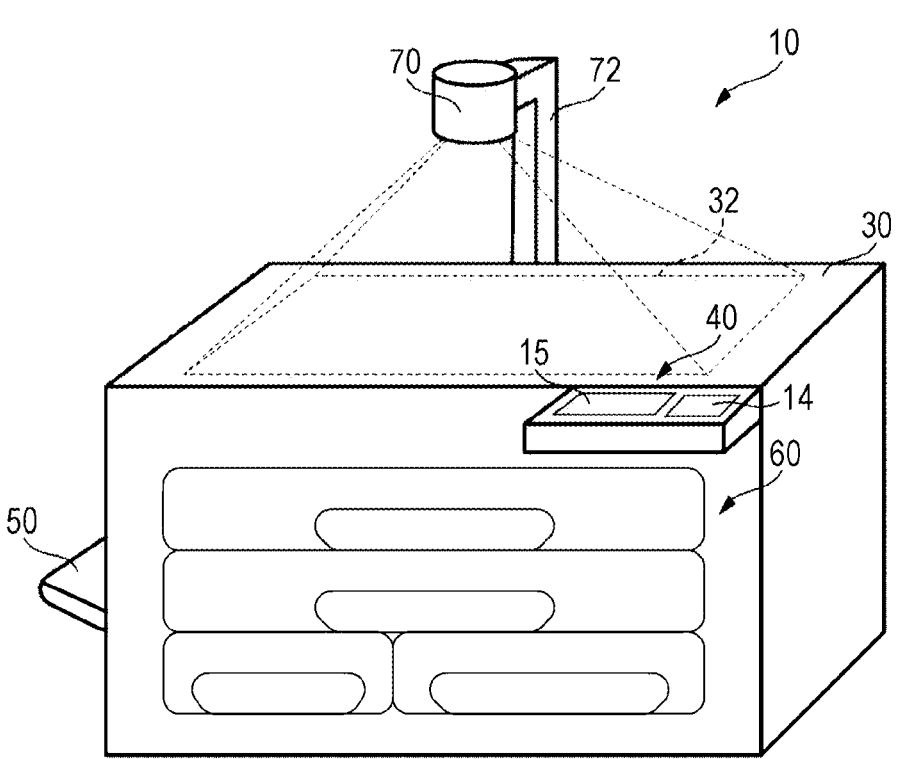
FIG. 1 is a perspective view illustrating an example of an overall configuration of an image processing apparatus according to an exemplary embodiment.

First, FIG. 1 will be referenced to describe a configuration of an image processing apparatus 10 according to the present exemplary embodiment. FIG. 1 is a perspective view illustrating an example of an overall configuration of the image processing apparatus 10 according to the present exemplary embodiment.

As illustrated in FIG. 1, the image processing apparatus 10 according to the present exemplary embodiment is provided with a document bed 30 on the upper surface of which a document is placed, a user interface unit (hereinafter referred to as the "UI unit") 40 that displays various information and is used to input various information, a tray 50 that delivers paper on which an image is formed, and a paper feed unit 60 that feeds various types of paper.

Also, the image processing apparatus 10 according to the present exemplary embodiment is provided with a document camera 70 configured to capture an image of the upper side of the document bed 30. The document camera 70 according to the present exemplary embodiment is provided on the other end of an arm 72 of which one end is secured to the back side of the document bed 30, and is positioned so that the image capture angle of view substantially coincides with a document placement area 32 on the document bed 30.

Note that in the present exemplary embodiment, a camera that captures a moving image in color is applied as the document camera 70, but the document camera 70 is not limited thereto. For example, a camera that captures a moving image in monochrome or grayscale may also be applied as the document camera 70.

On the other hand, the UI unit 40 according to the present exemplary embodiment is provided with an input unit 14 with various types of switches and a display unit 15 including a liquid crystal display panel or the like. The display unit 15 according to the present exemplary embodiment is configured as what is called a touch panel display provided with a transmissive touch panel on the front side of the display.

Note that in the present exemplary embodiment, a digital multi-function device including functions such as an image printing function, an image reading function, and an image transmitting function is applied as the image processing apparatus 10. However, the configuration is not limited to the above, and another image processing apparatus, such as an image processing apparatus including only an image printing function or an image processing apparatus including only an image printing function and an image reading function, may also be applied as the image processing apparatus 10.

Figure 2:
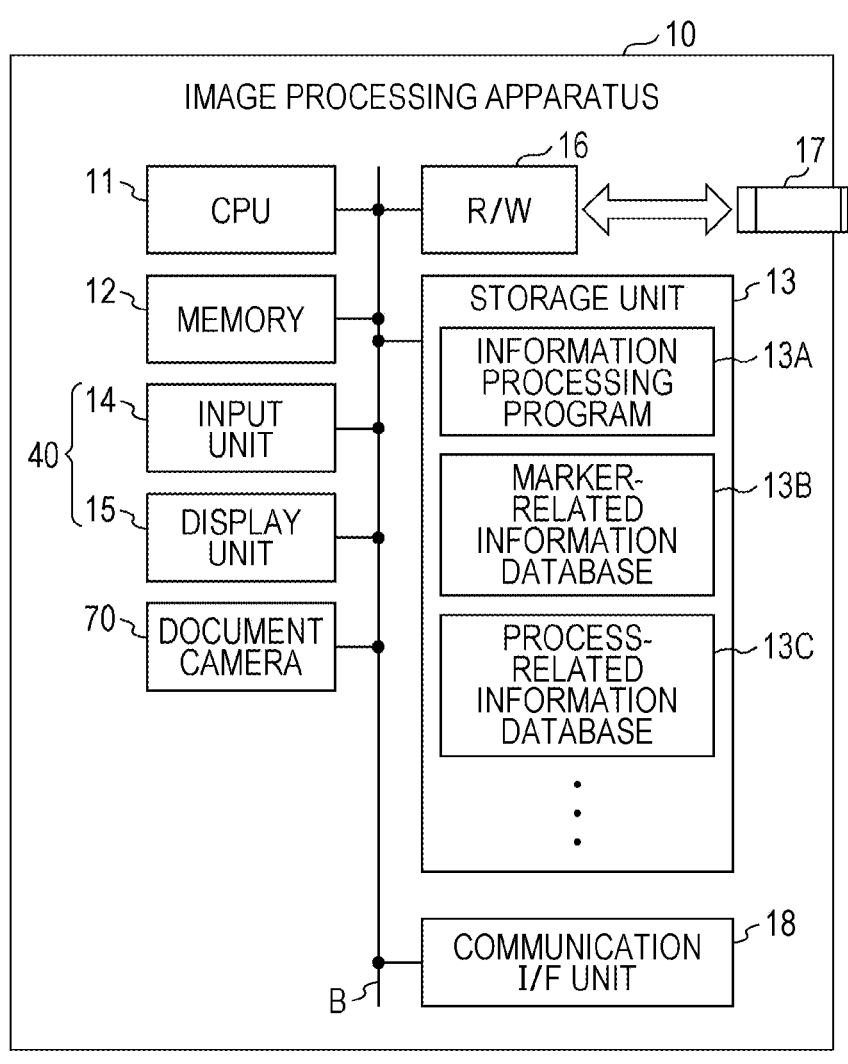
FIG. 2 is a block diagram illustrating an example of a hardware configuration of an electrical system of the image processing apparatus according to the exemplary embodiment.

Next, FIG. 2 will be referenced to describe a configuration of an electrical system of the image processing apparatus 10 according to the present exemplary embodiment. FIG. 2 is a block diagram illustrating an example of a hardware configuration of an electrical system of the image processing apparatus 10 according to the present exemplary embodiment.

As illustrated in FIG. 2, the image processing apparatus 10 according to the present exemplary embodiment is provided with a central processing unit (CPU) 11 as a processor, a memory 12 as a temporary storage area, a non-volatile storage unit 13, and the UI unit 40 including the input unit 14 and display unit 15 described above. The image processing apparatus 10 according to the present exemplary embodiment is also provided with a media reading/writing device (R/W) 16, a communication interface (I/F) unit 18, and the document camera 70 described above. The CPU 11, memory 12, storage unit 13, UI unit 40, media reading/writing device 16, communication OF unit 18, and document camera 70 are interconnected through a bus B. The media reading/writing device 16 reads out information written to a recording medium 17 and writes information to the recording medium 17.

The storage unit 13 according to the present exemplary embodiment is realized by a hard disk drive (HDD), a solid-state drive (SSD), flash memory, or the like. An information processing program 13A is stored in the storage unit 13, which acts as a storage medium. The information processing program 13A is stored (installed) in the storage unit 13 by connecting the recording medium 17 with the information processing program 13A written thereto to the media reading/writing device 16 and causing the media reading/writing device 16 to read out the information processing program 13A from the recording medium 17. The CPU 11 reads out and loads the information processing program 13A from the storage unit 13 into the memory 12, and sequentially executes processes included in the information processing program 13A.

In addition, a marker-related information database 13B and a process-related information database 13C are stored in the storage unit 13. Note that the marker-related information database 13B and the process-related information database 13C will be described in detail later.

Figure 3:
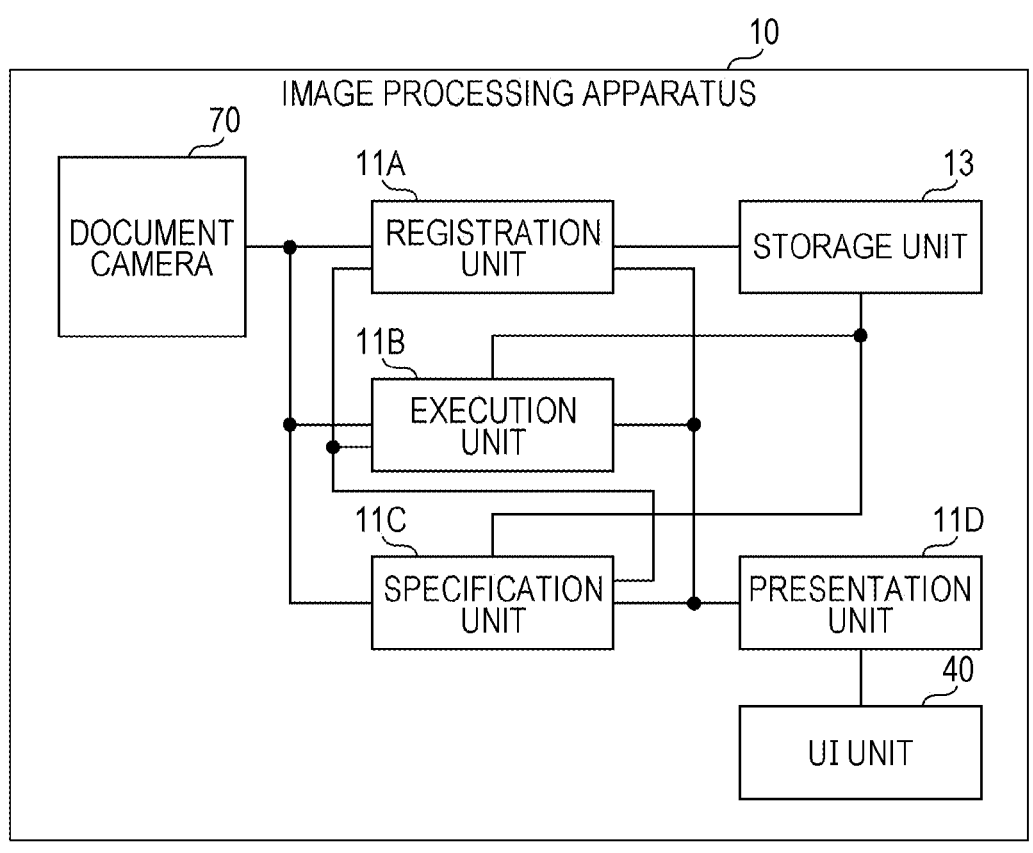
FIG. 3 is a block diagram illustrating an example of a functional configuration of the image processing apparatus according to the exemplary embodiment.

Next, FIG. 3 will be referenced to describe a functional configuration of the image processing apparatus 10 according to the present exemplary embodiment. FIG. 3 is a block diagram illustrating an example of a functional configuration of the image processing apparatus 10 according to the present exemplary embodiment.

As illustrated in FIG. 3, the image processing apparatus 10 according to the present exemplary embodiment includes a registration unit 11A, an execution unit 11B, a specification unit 11C, and a presentation unit 11D. The CPU 11 of the image processing apparatus 10 functions as the registration unit 11A, the execution unit 11B, the specification unit 11C, and the presentation unit 11D by executing the information processing program 13A.

In the case in which an area to be processed in a document is to be specified using the positions of markers placed on the surface of the document, and markers are placed on the surface of the document, the registration unit 11A according to the present exemplary embodiment uses the placement positions of the markers to specify the area to be processed and registers area information indicating the area to be processed.

Also, in the case in which markers are not placed on the surface of the document and area information is registered, the execution unit 11B according to the present exemplary embodiment executes predetermined processing with respect to the area to be processed that is indicated by the area information.

Furthermore, in the case in which markers are not placed on the surface of the document and area information is not registered, if area information is registered after a predetermined image area on the surface of the document is registered as a target, the specification unit 11C according to the present exemplary embodiment specifies the area to be processed that is indicated by the area information as the area to be targeted by the processing. In the present exemplary embodiment, the entire area of the document is applied as the predetermined image area, but the configuration is not limited thereto. For example, an area where characters are written in the document may also be applied as the predetermined image area.

Also, the specification unit 11C according to the present exemplary embodiment specifies the presence or absence of a placement of markers on the surface of the document if the document and the markers are stationary. Furthermore, the specification unit 11C according to the present exemplary embodiment specifies whether the document and the markers are stationary by using a captured image (in the present exemplary embodiment, an image captured by the document camera 70) of the area where the document is to be placed.

On the other hand, the presentation unit 11D according to the present exemplary embodiment presents operating mode information indicating whether the operating mode is a first operating mode for registering area information or a second operating mode for executing the processing. Also, if the first operating mode ends, the presentation unit 11D according to the present exemplary embodiment presents information indicating to remove the markers from the document.

Note that in the present exemplary embodiment, a presentation given via a display by the display unit 15 of the UI unit 40 is applied as the presentation by the presentation unit 11D, but the configuration is not limited thereto. For example, a presentation given by image formation by the image processing apparatus 10 or a presentation given by sound produced by a sound playback device may also be applied as the presentation by the presentation unit 11D.

Also, in the present exemplary embodiment, the content of the processing is specifiable from the markers. In the present exemplary embodiment, a marker expressed by a machine-readable code, such as a barcode, a two-dimensional code, or a pattern image generated according to a predetermined rule is applied as the markers. Also, in the present exemplary embodiment, a code that includes information indicating the content of the processing is applied as the machine-readable code. However, the markers are not limited to the above, and markers that do not include a machine-readable code or other code may also be applied. In this case, the content of the processing may be specifiable according to the characteristics of the appearance of the markers. In this configuration, the characteristics of the appearance may be at least one of color, density, and shape. Furthermore, even if a machine-readable code is used as the markers, the content of the processing may be specifiable according to the characteristics of the appearance, such as the color, of the markers.

Also, in the present exemplary embodiment, processing using the document camera 70 is applied as the processing, and more particularly, processing related to an image reading process is applied as the processing using the document camera 70, but the configuration is not limited thereto. For example, processing unrelated to the document camera 70, such as an image forming process by the image processing apparatus 10, may also be applied as the processing.

Figure 4:
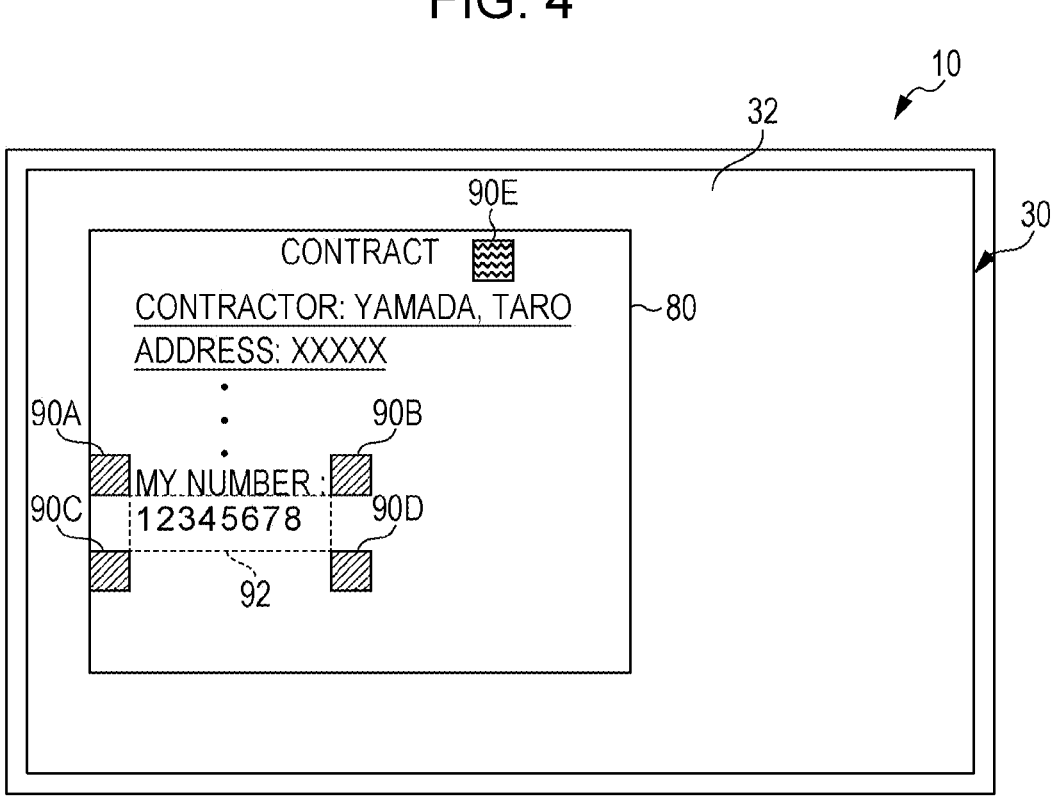
FIG. 4 is a plan view illustrating an example of a marker arrangement with respect to the image processing apparatus according to the exemplary embodiment.

Next, FIG. 4 will be referenced to describe a method of placing markers on the image processing apparatus 10. FIG. 4 is a plan view illustrating an example of a marker arrangement with respect to the image processing apparatus 10 according to the present exemplary embodiment.

As illustrated in FIG. 4, in the image processing apparatus 10 according to the present exemplary embodiment, when performing various processing using the document camera 70, the user first places a document 80 at any position in the document placement area 32 of the document bed 30.

As described above, a machine-readable code is used for markers 90A, 90B, and so on according to the present exemplary embodiment. Note that hereinafter, the markers 90A, 90B, and so on will be collectively referred to as the "markers 90" when not being distinguished individually.

Various types of markers 90 are prepared as the markers 90 according to the present exemplary embodiment and are classified into multiple types, such as area specification markers for specifying the area to be processed according to the positions where the markers are placed and execution process specification markers for specifying the content of the processing to be executed.

Additionally, as illustrated in FIG. 4, in the case of specifying an area to be processed with respect to the document 80 placed on the document bed 30, the user places area specification markers 90A to 90D at the positions of the four corners of the area to be processed. In this way, the present exemplary embodiment describes a case in which a rectangle is used as the shape of the area to be processed and the markers 90 are placed at the four corners of a rectangular area to be processed as the method of specifying the area to be processed, but the configuration is not limited thereto. For example, a rectangle may be applied as the shape of the area to be processed and the markers 90 may be placed at a pair of diagonally opposite corners of the rectangular area to be processed as the method of specifying the area to be processed. Moreover, the shape of the area to be processed is not limited to a rectangle, and another shape such as a triangle, a trapezoid, a pentagon, or a larger polygon, or a shape such as a circle may also be applied.

In the present exemplary embodiment, markers that also specify the content of the processing to be executed with respect to the specified area to be processed are applied as the area specification markers 90, and examples of the content of the processing in this case include a trimming process, a masking process, an optical character recognition/reader (OCR) process, and the like. Note that examples of the content of the processing for the execution process specification markers 90 include a forwarding process via email attachment or email notification, a printing (image forming) process, and the like.

In the example illustrated in FIG. 4, area specification markers 90 that indicate a masking process are applied as markers 90A to 90D, and in this case, a masking process is performed on an area 92 to be processed (in the example illustrated in FIG. 4, the area enclosing the numerals of a Japanese government-issued Individual Number, also known as a My Number) that is enclosed by the markers 90.

Also, in the example illustrated in FIG. 4, a marker 90E is an execution process specification marker 90, and in this case, there are no particular limitations on the position where the marker 90E is placed, and the marker 90E may be placed anywhere in the document placement area 32, inside or outside the upper surface of the document 80.

In the case in which the area 92 to be processed in the document 80 is specified using the positions of the markers 90 placed on the surface of the document 80 as described above, the image processing apparatus 10 according to the present exemplary embodiment operates as follows.

First, if area specification markers 90 are placed on the surface of the document 80, the image processing apparatus 10 uses the placement positions of the markers 90 to specify the area to be processed and registers area information indicating the area to be processed.

Also, in the case in which area specification markers 90 are not placed on the surface of the document 80 and area information is registered, the image processing apparatus 10 executes predetermined processing with respect to the area to be processed that is indicated by the area information.

Furthermore, in the case in which area specification markers 90 are not placed on the surface of the document 80 and area information is not registered, the image processing apparatus 10 registers a predetermined area on the surface of the document 80 as a target. Additionally, in the case in which area information is registered after the above registration is performed, the image processing apparatus 10 specifies the area to be processed that is indicated by the area information as the area to be targeted by the processing.

Next, FIG. 5 will be referenced to describe the marker-related information database 13B according to the present exemplary embodiment. FIG. 5 is a schematic diagram illustrating an example of the structure of the marker-related information database 13B according to the present exemplary embodiment.

The marker-related information database 13B according to the present exemplary embodiment is a database in which information related to the markers 90 described above is registered. In one example, as illustrated in FIG. 5, information pertaining to each of a marker type, a placement method, a marker identification (ID), and processing content is associated with each other and stored in the marker-related information database 13B according to the present exemplary embodiment.

The marker type is information indicating the type of the markers 90 described above, and the placement method is information indicating the method of placing the markers 90 described above. Also, the marker ID is preassigned information which is different for each type of marker and each type of processing content to identify the corresponding marker, and the processing content is information indicating the content of the processing represented by the corresponding marker.

In the example illustrated in FIG. 5, for instance, for the marker 90 assigned "A01" as the marker ID, information is registered to indicate that the type is area specification, the placement method is a method of enclosing the area to be processed, and the content of the processing is the trimming of an image. Accordingly, by referencing the marker-related information database 13B, it is possible to ascertain the type, placement method, and content of processing for a marker 90 preregistered in the database.

That is, in the present exemplary embodiment, information indicating the content of the processing is itself not included in the marker 90, but information indicating the marker ID is included in the marker 90. Furthermore, in the present exemplary embodiment, by acquiring information indicating the content of the processing corresponding to the marker ID from the marker-related information database 13B, the content of the corresponding processing is specified. However, the configuration is not limited to the above, and information indicating the content of the processing itself may also be included in the marker 90. In this case, the marker-related information database 13B would be unnecessary.

Next, FIG. 6 will be referenced to describe the process-related information database 13C according to the present exemplary embodiment. FIG. 6 is a schematic diagram illustrating an example of the structure of the process-related information database 13C according to the present exemplary embodiment.

The process-related information database 13C according to the present exemplary embodiment is a database in which information related to processed specified by the user using the markers 90 is registered. In one example, as illustrated in FIG. 6, information pertaining to each of processing content and a set value is associated with each other and stored in the process-related information database 13C according to the present exemplary embodiment.

The processing content is information indicating the content of the corresponding processing, and is information corresponding to the processing content in the marker-related information database 13B. Also, the set value is information to be set with respect to the corresponding processing.

Note that in the case in which the markers 90 are area specification markers, an area to be processed in a single location is specified by a set of four markers 90, and singular coordinate information indicating the area to be processed that is specified by the placement positions of the set of markers 90 is applied as the set value (corresponding to the "area information" described above) in this case. In the present exemplary embodiment, information indicating coordinates in a two-dimensional coordinate system with the origin set to the upper-left corner of the document 80 is applied as the coordinate information, but the coordinate information is not limited thereto. For example, information indicating coordinates in a two-dimensional coordinate system with the origin set to any of the lower-left corner, the upper-right corner, and the lower-right corner among the four corners of the document 80 may also be applied as the coordinate information. Also, in the present exemplary embodiment, as illustrated in FIG. 6, information indicating the positions of a pair of diagonally opposite corners of the area to be processed is applied as the coordinate information indicating the area to be processed, but obviously the coordinate information is not limited thereto.

In this way, in the present exemplary embodiment, since one of the corners of the document 80 is applied as the coordinate system indicating the position of the area to be processed, it is possible to place the document 80 at any position in the document placement area 32.

Also, in the case in which the markers 90 are markers for a purpose other than area specification, a single set value may be set with respect to a single marker 90. For example, in the case in which the content of the processing is a forwarding process via email attachment, information indicating the forwarding destination (in the present exemplary embodiment, a device name) is the set value, whereas in the case in which the content of the processing is printing, a set value is unnecessary.

Note that, to avoid confusion, the present exemplary embodiment describes a case in which a relevant set value, such as the above information indicating a forwarding destination, is registered in advance, but the configuration is not limited thereto. For example, the user or someone else may also be prompted to input a set value, as appropriate.

In the example illustrated in FIG. 6, for instance, for the image illustrating the document 80, information for performing a masking process with respect to a rectangular area having a pair of diagonally opposite corners located at (X1, Y1)-(X2, Y2) is registered. Also, in the example illustrated in FIG. 6, processing by which image information representing the document 80 obtained from the masking process is transmitted as an email attachment to a server A is registered as the processing with respect to the image illustrating the document 80.

Figure 7:
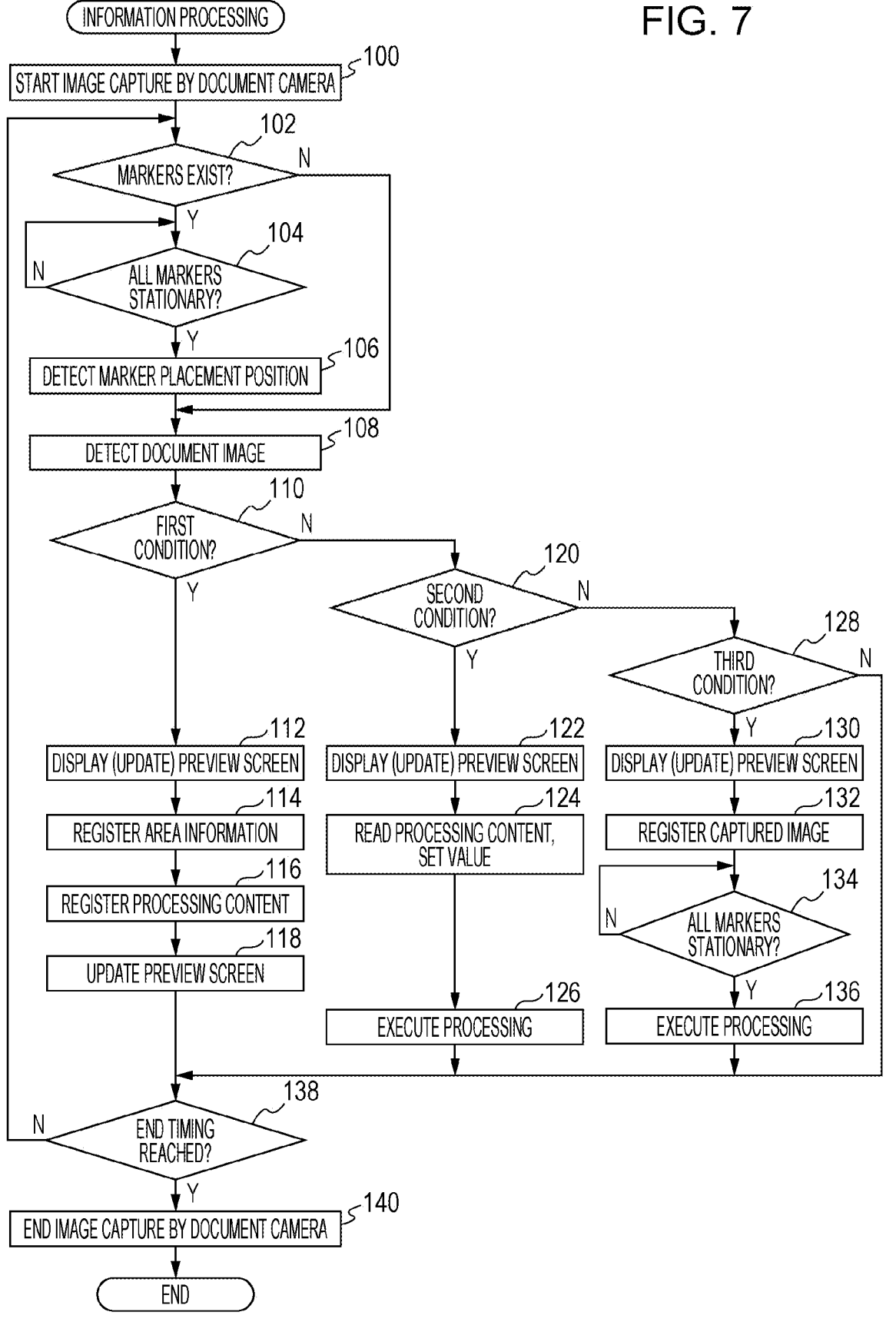
FIG. 7 is a flowchart illustrating an example of information processing according to the exemplary embodiment.

Next, FIGS. 7 to 10 will be referenced to describe the actions of the image processing apparatus 10 when executing information processing. FIG. 7 is a flowchart illustrating an example of information processing according to the present exemplary embodiment.

The information processing illustrated in FIG. 7 is executed by the CPU 11 of the image processing apparatus 10 executing the information processing program 13A if an instruction to execute information processing is given by the user through the UI unit 40. Note that the method of executing the information processing is not limited to such a user-directed method. For example, the information processing may also be executed if the document 80 and the markers 90 are placed in the document placement area 32 of the document bed 30 after a predetermined period (in the present exemplary embodiment, 10 minutes) or longer has elapsed since the execution of the information processing was last completed. Also, to avoid confusion, the following assumes that the users also uses area specification markers 90 when placing the markers 90.

In step 100 of FIG. 7, the CPU 11 transmits an instruction causing the document camera 70 to start the capture of a moving image. In response to the instruction, the document camera 70 starts the capture of a moving image.

Meanwhile, after giving the instruction to execute information processing, the user is assumed to place the document 80 in the document placement area 32 and place markers 90 corresponding to the desired processing, as appropriate.

Accordingly, in step 102, the CPU 11 references the image at this point in time (a still image, hereinafter referred to as the "reference image") in the image captured as a moving image in color (hereinafter simply referred to as the "captured image") obtained from the document camera 70. Thereafter, the CPU 11 determines whether the markers 90 are included in the subject of the reference image, and proceeds to step 108 in the case of a negative determination, or proceeds to step 104 in the case of a positive determination. Note that in the present exemplary embodiment, the determination of whether the markers 90 are included in the subject is made by using known technology of the related art to determine whether images illustrating the machine-readable code described above are included in the subject, but the determination is not limited thereto. For example, information indicating the shape of the markers 90 may be registered in advance, and the determination of whether the markers 90 are included in the subject may be made by determining whether the markers 90 exist according to pattern matching using the registered information. As another example, images of the markers 90 may be detected by artificial intelligence (AI) using a pre-trained segmentation model such as a semantic segmentation model or an instance segmentation model.

In step 104, the CPU 11 stands by until the movement of all of the markers 90 associated with the placement of the markers 90 by the user stops and the markers 90 are stationary. Note that in the present exemplary embodiment, the movement of all of the markers 90 is determined to be stopped upon reaching a state in which there is no motion in the subject of the captured image for a predetermined period (in the present exemplary embodiment, 5 seconds), but the determination is not limited thereto. For example, a marker 90 to be placed last may be prepared as one of the markers 90, and the movement of all of the markers 90 may be determined to be stopped if the last marker 90 is detected from the captured image and is stationary.

In step 106, the CPU 11 references the reference image described above to detect the placement positions of all of the markers 90 included in the reference image. Note that in the present exemplary embodiment, the placement positions of all of the markers 90 may be detected by specifying the positions of images indicating the machine-readable code described above which are included in the subject, but the detection is not limited thereto. For example, information indicating the shape of the markers 90 may be registered in advance, and placement positions of all of the markers 90 may be detected by specifying the positions where the markers 90 exist according to pattern matching using the registered information.

In step 108, the CPU 11 detects an image illustrating the document 80 (hereinafter referred to as the "document image") from the reference image. Note that in the present exemplary embodiment, the document image is detected by preregistering information pertaining to each of the outline shape and dimensions for each type of document 80 supported by the image processing apparatus 10 and detecting an area that is consistent with the registered outline shape and dimensions, but the detection is not limited thereto. For example, the document image may also be detected by using the base color of the document 80 in addition to the outline shape and dimensions.

In step 110, the CPU 11 determines whether a condition stipulating that the markers 90 are placed on the surface of the document 80 is satisfied, and proceeds to step 112 in the case of a positive determination.

Figure 8:
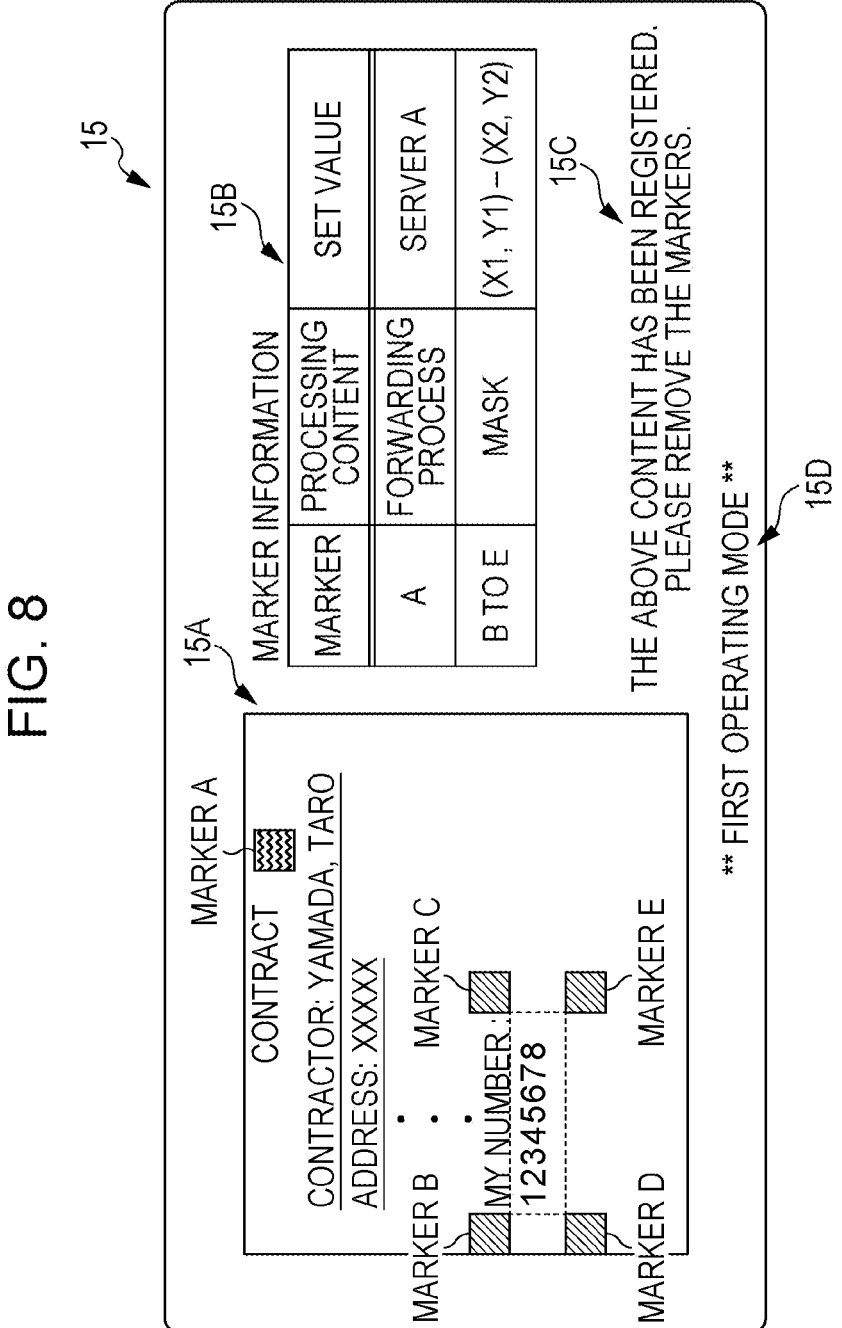
FIG. 8 is a front view illustrating an example of a preview screen according to the exemplary embodiment.

In step 112, the CPU 11 controls the display unit 15 to display (or update, if a preview screen is already being displayed) a preview screen with a predefined layout. FIG. 8 illustrates an example of the preview screen according to the present exemplary embodiment.

As illustrated in FIG. 8, on the preview screen according to the present exemplary embodiment, a document image 15A included in the reference image is displayed together with names, such as marker A and marker B, individually assigned to each image of the markers 90. Also, on the preview screen according to the present exemplary embodiment, an image (hereinafter referred to as the "table image") 15B is displayed in which each of the detected markers 90 is associated with the corresponding processing content and set value in a table layout. Furthermore, on the preview screen according to the present exemplary embodiment, an operating mode indication message 15D is displayed to indicate the operating mode (the first operating mode described above) at this point in time. Note that a status indication message 15C illustrated in FIG. 8 is not displayed on the preview screen at this point in time.

The CPU 11 specifies the marker ID expressed by the machine-readable code of the markers 90 detected by the processing in the preceding step 106, and acquires, from the marker-related information database 13B, information pertaining to each of the marker type and processing content corresponding to the specified marker ID. Note that for the set of four markers 90 of the marker type for area specification, the CPU 11 uses the placement position of each to specify the area to be processed described above.

In step 114, the CPU 11 registers the specified area to be processed as a set value in the corresponding storage area of the process-related information database 13C.

In step 116, the CPU 11 registers information indicating the processing content of all of the markers 90 acquired by the processing in step 112 in the corresponding storage area of the process-related information database 13C. At this time, for the set of four markers 90 for area specification, the CPU 11 registers the processing content registered by the processing in step 112 in association with the set value indicating the corresponding area to be processed.

In step 118, the CPU 11 updates the preview screen being displayed on the display unit 15 to additionally display the status indication message 15C as illustrated in FIG. 8, for example, and thereafter proceeds to step 138. As illustrated in FIG. 8, in the status indication message 15C according to the present exemplary embodiment, a message is displayed to indicate that the content illustrated in the table image 15B has been registered in the process-related information database 13C. also, in the status indication message 15C according to the present exemplary embodiment, a message is displayed to instruct the user to remove the markers 90 from the document 80. Accordingly, by referring to the status indication message 15C, the user is able to grasp that information pertaining to the markers 90 that the user placed has been registered, and the user removes the markers 90 from the document bed 30.

On the other hand, in the case of a negative determination in step 110, the CPU 11 proceeds to step 120. In step 120, the CPU 11 determines whether a condition is satisfied, the condition stipulating that the markers 90 are not placed on the surface of the document 80 and that a set value indicating the area to be processed is registered, and proceeds to step 122 in the case of a positive determination.

Figure 9:
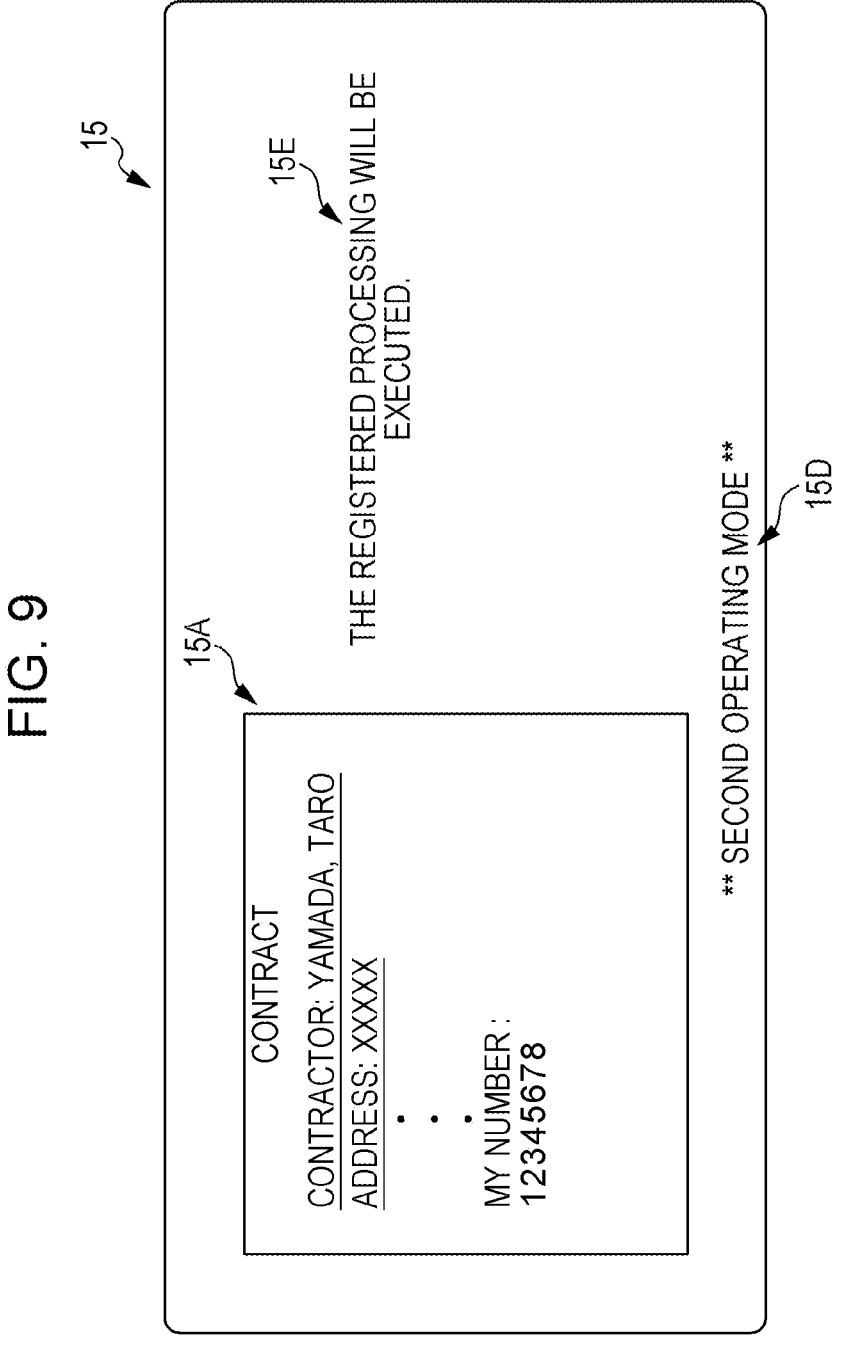
FIG. 9 is a front view illustrating an example of a preview screen according to the exemplary embodiment.

In step 122, the CPU 11 controls the display unit 15 to display (or update, if a preview screen is already being displayed) a preview screen with a predefined layout. FIG. 9 illustrates an example of the preview screen according to the present exemplary embodiment at this point in time.

As illustrated in FIG. 9, on the preview screen at this point in time, the document image 15A of the document 80 included in the reference image is displayed. Also, on the preview screen at this point in time, a message 15E is displayed to indicate that processing with the registered content will be performed, and the operating mode indication message 15D is displayed to indicate the operating mode (the second operating mode described above) at this point.

In step 124, the CPU 11 reads out all of the processing content and set values from the process-related information database 13C, and in step 126, the CPU 11 executes processing according to the processing content and set values that have been read out.

According to the processing in step 126, processing is executed with respect to the document 80 for which information pertaining to the processing indicated by the markers 90 has been registered with the markers 90 placed on the surface of the document 80, the processing being executed using the registered information pertaining to the processing and with the markers 90 removed. Also, according to the processing in step 126, the processing is executed with respect to the document 80 placed on the document bed 30 with the markers 90 not placed, the processing being executed using the registered information pertaining to the processing.

On the other hand, in the case of a negative determination in step 120, the CPU 11 proceeds to step 128. In step 128, the CPU 11 determines whether a condition is satisfied, the condition stipulating that the markers 90 are not placed on the surface of the document 80 and that a set value indicating the area to be processed is not registered, and proceeds to step 138 in the case of a negative determination, or proceeds to step 130 in the case of a positive determination.

Figure 10:
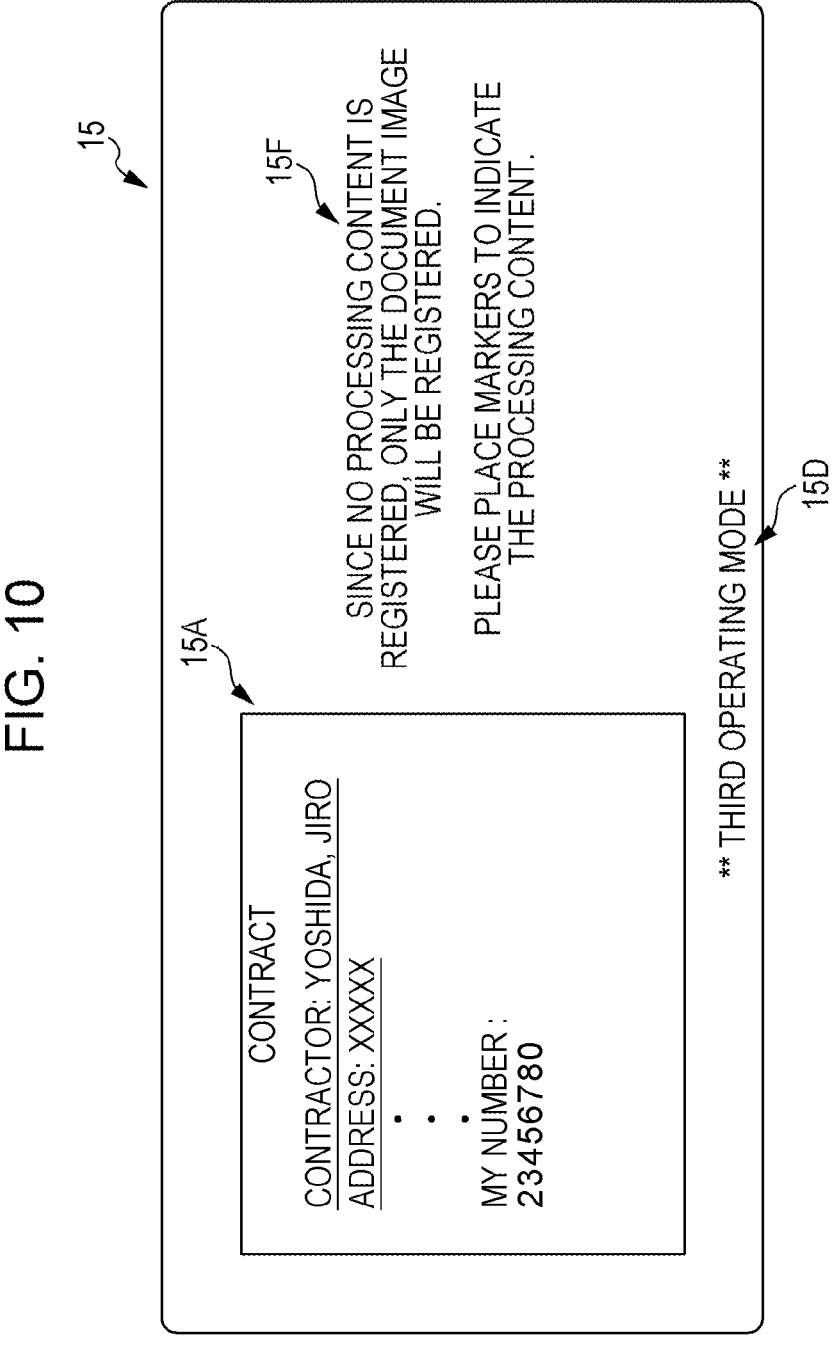
FIG. 10 is a front view illustrating an example of a preview screen according to the exemplary embodiment.

In step 130, the CPU 11 controls the display unit 15 to display (or update, if a preview screen is already being displayed) a preview screen with a predefined layout. FIG. 10 illustrates an example of the preview screen according to the present exemplary embodiment at this point in time.

As illustrated in FIG. 10, on the preview screen at this point in time, the document image 15A of the document 80 included in the reference image is displayed. Also, since processing content has not been registered, a message 15F is displayed on the preview screen at this point in time to indicate that only the registration of the document image will be performed and to prompt the user to place the markers 90 indicating the processing content. Furthermore, on the preview screen according to the present exemplary embodiment, the operating mode indication message 15D is displayed to indicate the operating mode (in the present exemplary embodiment, a third operating mode) at this point in time.

In step 132, the CPU 11 registers the predetermined image area as the area to be processed from the image information indicating the reference image.

On the other hand, the user refers to the message 15F, and after grasping that only the registration of a document image will be performed for the document 80 that the user has placed, the user places the corresponding markers 90 to designate the processing to be executed with respect to the document 80.

Accordingly, in step 134, similarly to the processing in step 104 described above, the CPU 11 stands by until the movement of all of the markers 90 associated with the placement of the markers 90 by the user stops and the markers 90 are stationary.

In step 136, the CPU 11 reads out from the storage unit 13 the image information registered by the processing in step 132, executes, with respect to the image information, the processing specified by the markers 90 placed by the user, and thereafter proceeds to step 138. Note that when executing the processing in step 136, the CPU 11 specifies the processing content and the set value specified by the markers 90 placed by the user, similarly to the processing in step 112 described above.

In step 138, the CPU 11 determines whether a predetermined end timing as a timing at which to end the current information processing has been reached, and returns to step 102 in the case of a negative determination or proceeds to step 140 in the case of a positive determination. In the present exemplary embodiment, the timing at which a marker 90 is used to indicate that there is no next document 80 is applied as the end timing, but the end timing is not limited thereto. For example, the timing at which instruction input for ending the information processing is given through the UI unit 40 may also be applied as the end timing.

In step 140, the CPU 11 transmits an instruction causing the document camera 70 to stop the capture of the moving image, and thereafter ends the current information processing. In response to the instruction, the document camera 70 stops the capture of the moving image.

Figure 11:
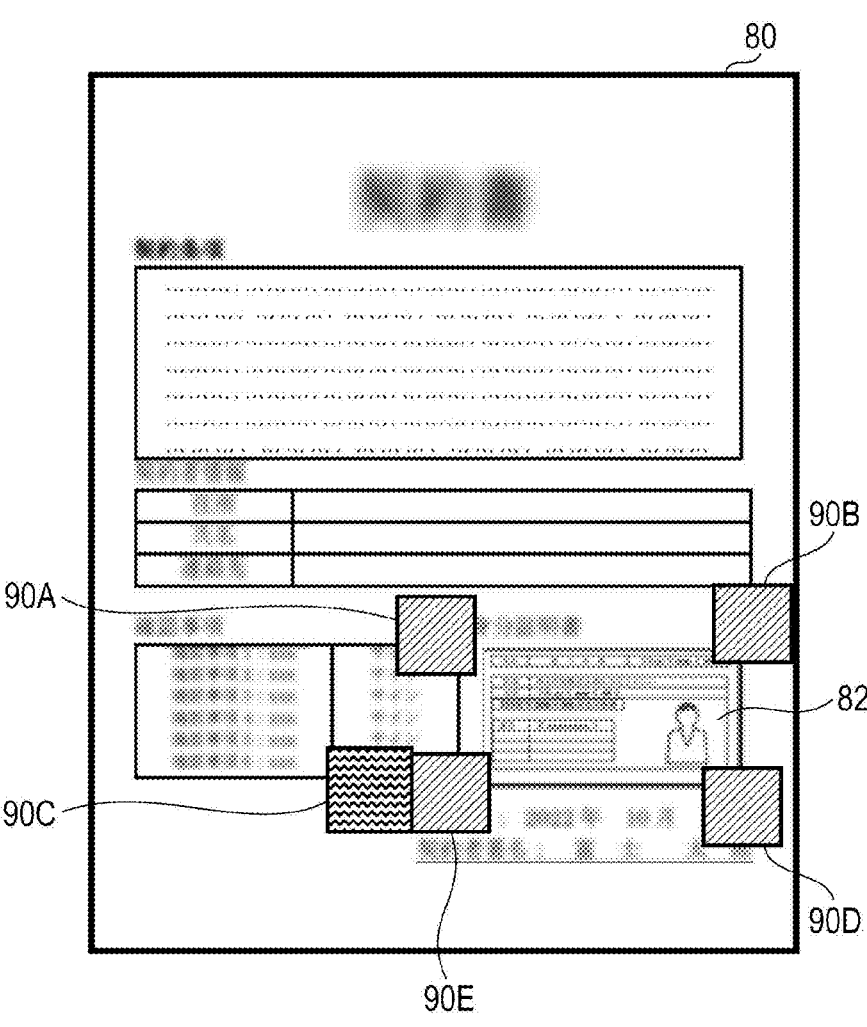
FIG. 11 is a diagram provided to explain a specific case of a situation handleable by information processing according to the exemplary embodiment, and illustrates an example in which characters are obscured by markers.
Figure 13:
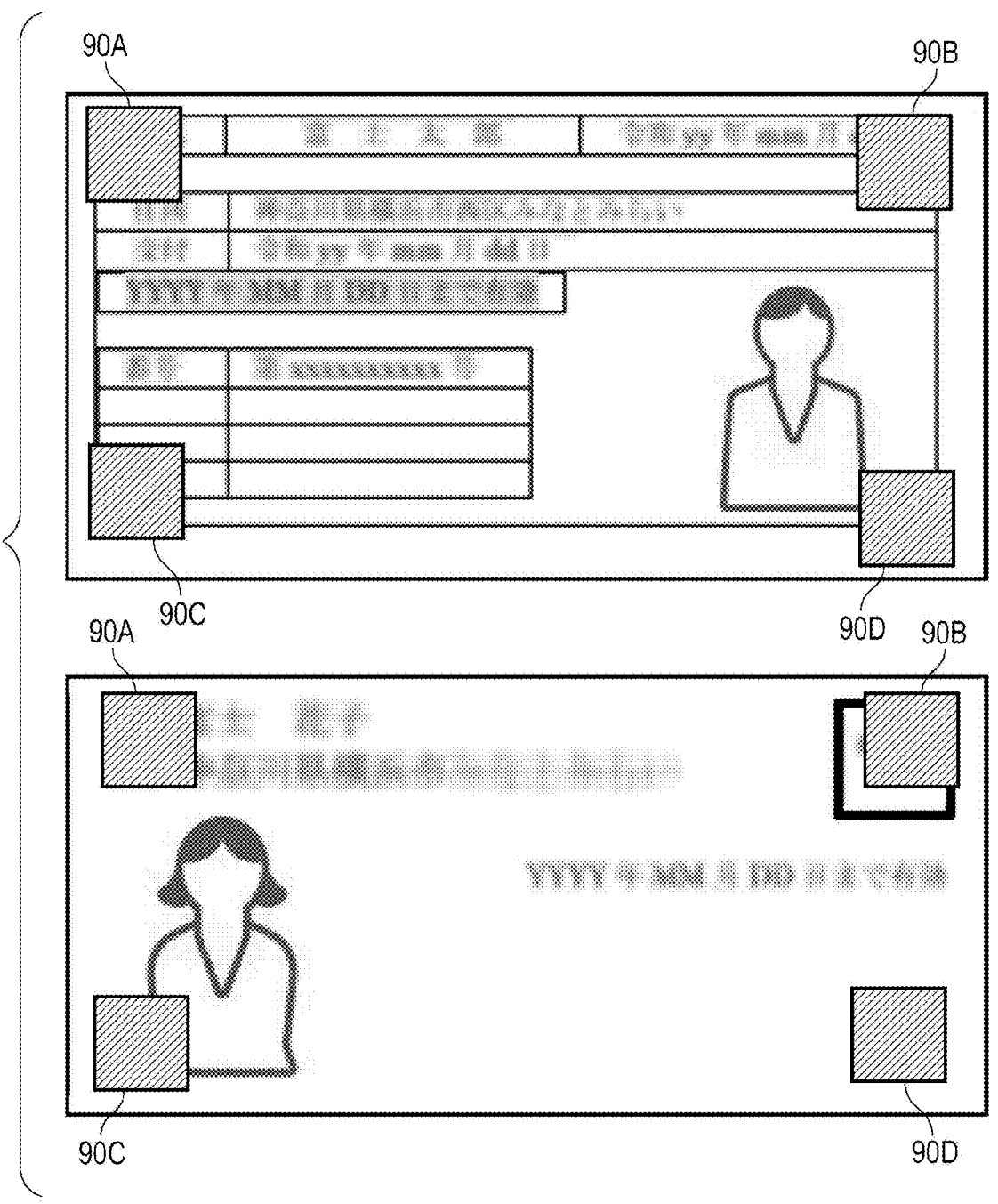
FIG. 13 is a diagram provided to explain a specific case of a situation handleable by information processing according to the exemplary embodiment, and illustrates an example in which characters are obscured by markers.

Next, FIGS. 11 to 15 will be referenced to describe specific case examples of situations handleable by the information processing according to the present exemplary embodiment. First, FIGS. 11 to 13 will be referenced to describe a first case example. Note that FIG. 11 is a diagram illustrating an example in which characters are obscured by markers, FIG. 12 is a diagram illustrating an example of the expected processing state, and FIG. 13 is a diagram illustrating an example in which characters are obscured by markers.

As illustrated in FIG. 11, in the first case example, the document 80 is assumed to be a contract. Also, as illustrated in FIG. 12, in the first case example, the content of the processing is assumed to be converting a date written in the contract into text data by OCR processing, using the date as a file name, and attaching a high-resolution scanned image 83 of an identity document 82 as an attachment to an image 81 of the document 80.

In this case, markers 90 of a certain size are prepared so that the markers 90 will be read correctly. As illustrated in FIG. 11, in the case of a scanning format in which the identity document 82 is placed on top of the document 80, if the markers 90 are placed on the outside of the identity document 82, the characters written in the contract will be obscured. Note that in the example illustrated in FIG. 11, characters are obscured by the markers 90A, 90C, 90D, and 90E.

Also, if a desired area to perform OCR processing on exists near the markers 90 placed on the outside of the identity document 82, it may be difficult to place the markers 90 for OCR processing. Note that in the example illustrated in FIG. 11, the marker 90C is not placed appropriately.

On the other hand, since the identity document 82 is card-sized in many cases, placing the markers 90 on top of the identity document 82 obscures the desired information to be scanned, as illustrated in FIG. 13, for instance. Note that in the example illustrated in the upper part of FIG. 13, the marker 90B is obscuring the desired information to be scanned, and in the example illustrated in the lower part of FIG. 13, the marker 90A is obscuring the desired information to be scanned.

For this reason, in the technology of the related art, giving instructions requires the user to place the markers 90 and carry out scanning multiple times for each instruction to be given using the markers 90.

In contrast, in the information processing according to the present exemplary embodiment, a process is added to register an instruction given by the markers 90, and since it is possible to register instructions multiple times, when a scan is executed in a state without the markers 90 being placed, modification processing and forwarding processing may be performed in accordance with the instructions given by the markers 90 that have been registered.

Figure 14:
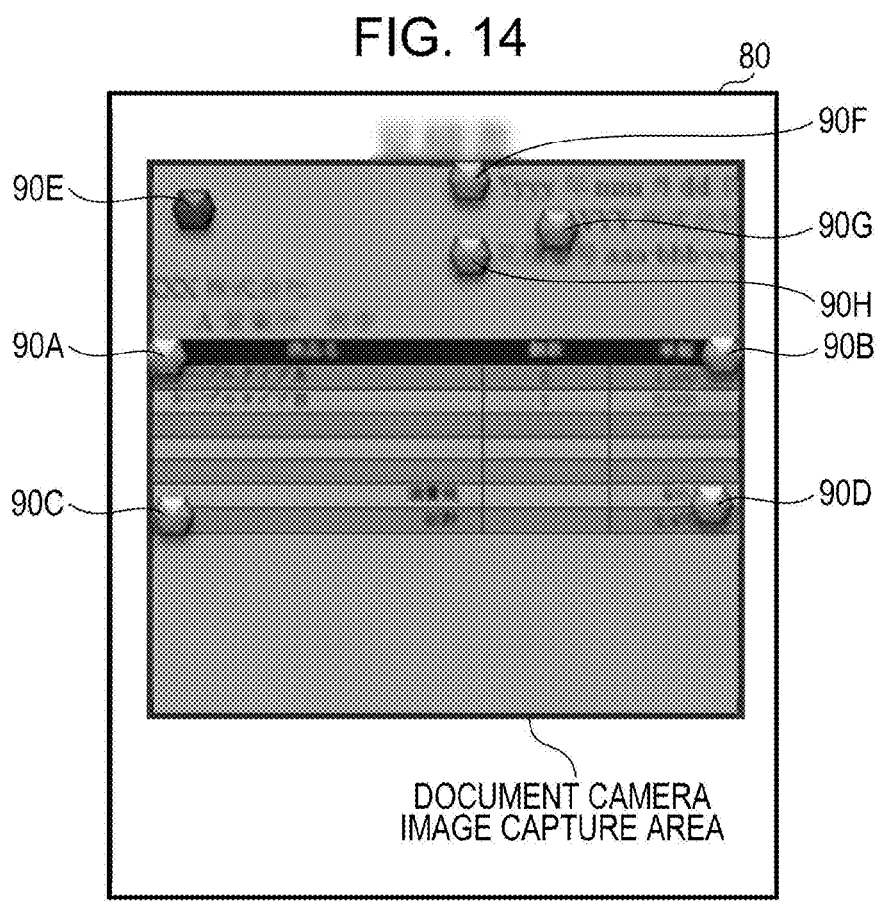
FIG. 14 is a diagram provided to explain a specific case of a situation handleable by information processing according to the exemplary embodiment, and illustrates an example of a document and marker arrangement.
Figure 15:
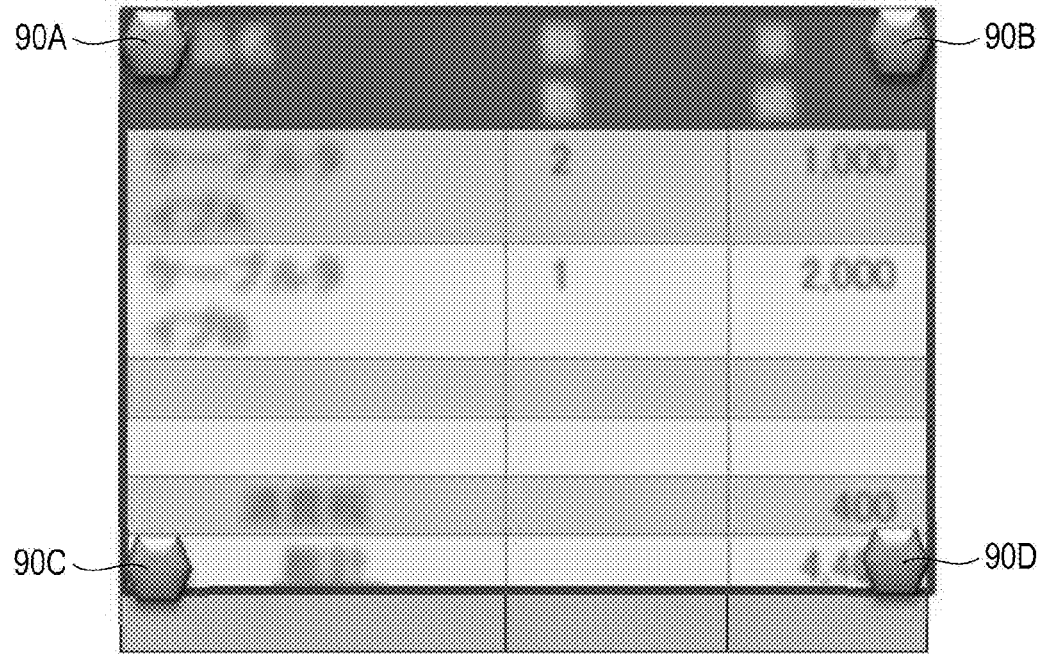
FIG. 15 is a diagram provided to explain a specific case of a situation handleable by information processing according to the exemplary embodiment, and illustrates an example in which characters are obscured by markers.

Next, FIGS. 14 and 15 will be referenced to describe a second case example. Note that FIG. 14 is a diagram illustrating an example of a document and marker arrangement, and FIG. 15 is a diagram illustrating an example in which characters are obscured by markers. Note that in the second case example, a situation is described in which the content of the processing is specifiable according to the characteristics of the appearance (here, the color) of the markers 90. However, in the examples of FIGS. 14 and 15, the color of the markers 90 is represented by grayscale density out of convenience.

As illustrated in FIG. 14, in the second case example, the document 80 is assumed to be a quotation with a relatively small font size. Also, the second case example assumes that the portion of a list of quoted products indicated by the quotation is to be scanned, converted into a PDF document with the quotation date, a quotation number, and the delivering company name set as the file name, and sent by email to a person in charge of purchasing.

In the case of applying OCR processing to the document 80, characters may not be read if the document 80 is placed at a position away from the document camera 70, and therefore the document 80 is placed close enough to allow for successful OCR processing, as illustrated in FIG. 14, for instance.

In this case, as illustrated in FIG. 15, for instance, if the desired range to be read is specified with the markers 90, depending on the size of the desired area to be specified, the markers 90 may be placed on top of characters and thereby obscure the desired information to be read so that the information is not read successfully. Note that in the example illustrated in FIG. 15, characters are obscured by the markers 90A and 90D.

In the technology of the related art, if a scan is performed without placing the markers 90, no instruction will be given by the markers 90, and thus the reading position (area to be processed) will not be specified.

In contrast, in the information processing according to the present exemplary embodiment, instead of reading the markers 90 and the document 80 at the same time, a process is added to automatically detect that the markers 90 have been placed and register an instruction given by the markers 90. For this reason, when a scan is executed in a state without the markers 90 being placed, modification processing and forwarding processing may be performed in accordance with the instructions given by the markers 90 that have been registered.

Figure 16:
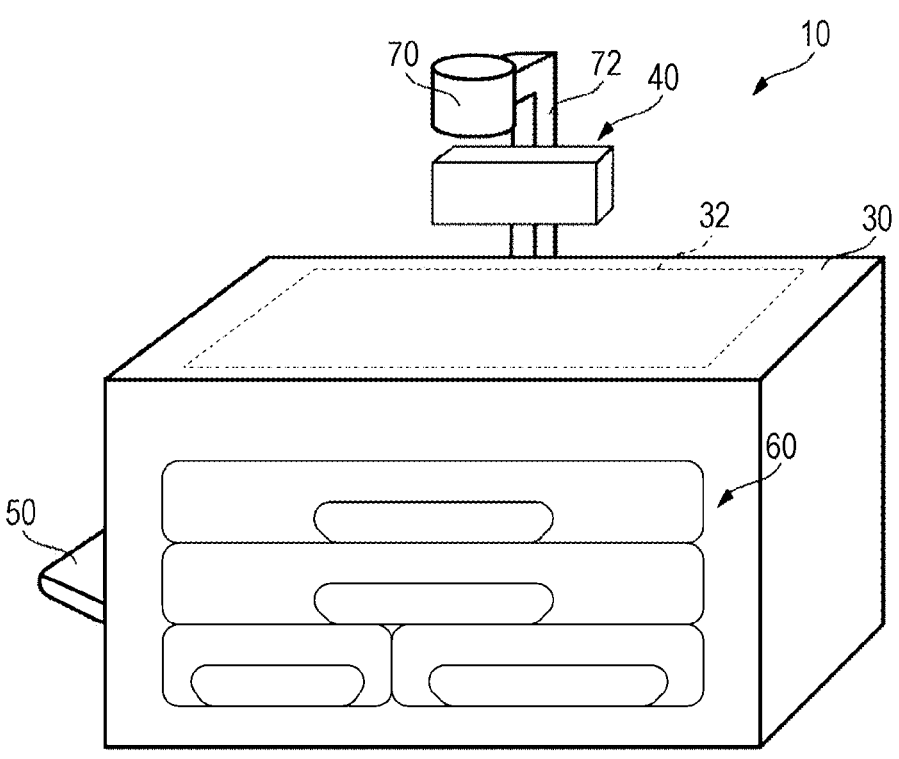
FIG. 16 is a perspective view illustrating an example of an overall configuration of an image processing apparatus according to another exemplary embodiment.

Note that the exemplary embodiment above describes a case of applying the technology of the present disclosure to an image processing apparatus 10 with the UI unit 40 located on the front side of the apparatus, as illustrated in FIG. 1, for instance, but the configuration is not limited thereto. For example, as illustrated in FIG. 16, the technology of the present disclosure may also be applied to an image processing apparatus 10 with the UI unit 40 located on the back side of the apparatus (in the example illustrated in FIG. 16, on the arm 72 of the document camera 70).

Also, the exemplary embodiment above describes a case in which information related to all of the applied markers 90 is displayed in the table image 15B on the preview screen, but the configuration is not limited thereto. For example, only information corresponding to the markers 90 that the user has specified with respect to the displayed document image 15A may be displayed as the table image 15B.

Also, although the physical type of the markers is not specifically mentioned in the exemplary embodiment above, any of various physical types of markers, such as a magnet type, a flat marble type, a tag type, or a sticker type, may be applied.

Also, although not mentioned in the exemplary embodiment above, characters indicating the processing content or the like may also be written on the markers 90, for example.

Also, the exemplary embodiment above describes a case in which only information indicating the content of the processing is included in the markers 90, but the configuration is not limited thereto. For example, the set value in addition to information indicating the content of the processing may also be included in the markers 90.

Also, the exemplary embodiment above describes a case in which the first operating mode is ended if a configuration different from the condition for starting the execution of the first operating mode is satisfied, but the configuration is not limited thereto. For example, the first operating mode may be ended if there are multiple markers 90 and the detection of the last marker 90 is finished.

Also, the exemplary embodiment above describes a case in which various databases are registered in the image processing apparatus 10, but the configuration is not limited thereto. For example, various databases may be registered in an external apparatus such as a server apparatus configured to communicate with the image processing apparatus 10, and the external apparatus may be accessed, as appropriate.

The foregoing describes an exemplary embodiment, but the technical scope of the present disclosure is not limited to the scope described in the exemplary embodiment above. Various modifications or alterations may be made to the exemplary embodiment above within a scope that does not depart from the gist of the present disclosure, and any embodiments obtained by such modifications or alterations are also included in the technical scope of the present disclosure.

Furthermore, the exemplary embodiment above does not limit the present disclosure as stated in the claims, and not all combinations of features described in the exemplary embodiment are necessarily required as means for addressing the issues of the present disclosure. The exemplary embodiment described above includes various levels of disclosure, and the various disclosures are elicited through the combination of the multiple structural elements disclosed herein. Even if several structural elements are removed from among all of the structural elements illustrated in the exemplary embodiment, the configuration with the several structural elements removed therefrom may still be elicited as an disclosure insofar as an effect is obtained.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Furthermore, the exemplary embodiment above describes a case in which the information processing is achieved by a software configuration using a computer by executing a program, but the present disclosure is not limited thereto. For example, the information processing may also be achieved by a hardware configuration, or by a combination of a hardware configuration and a software configuration. Also, the document camera 70 is described as being configured to capture an image of the upper side of the document bed 30, but is not limited thereto, and may also be configured to apply the processing according to an exemplary embodiment of the present disclosure to an image obtained by capturing a document image with a camera provided to a smartphone or a laptop computer as the captured image data.

Otherwise, the configuration of the image processing apparatus 10 described in the exemplary embodiment above is an example, and obviously, unnecessary portions may be removed or new portions may be added within a scope that does not depart from the gist of the present disclosure.

Also, the flow of the information processing described in the exemplary embodiment above is an example, and obviously, unnecessary steps may be removed, new steps may be added, or the processing sequence may be rearranged within a scope that does not depart from the gist of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing apparatus comprising:

a processor configured such that, in a situation in which an area to be processed in a document is specified using a position of a marker placed on a surface of the document, in a case in which the marker is placed on the surface of the document, the processor is configured to use a placement position of the marker to specify the area to be processed and register area information indicating the area to be processed;

in a case in which the marker is not placed on the surface of the document and the area information is registered, the processor is configured to execute predetermined processing with respect to the area to be processed that is indicated by the area information; and in a case in which the marker is not placed on the surface of the document and the area information is not registered, if the area information is registered after a predetermined area on the surface of the document is registered as a target, the processor is configured to specify the area to be processed that is indicated by the area information as the area to be targeted by the processing.

(((2)))

The information processing apparatus according to (((1))), wherein the processor is configured to specify a presence or absence of a placement of the marker on the surface of the document if the document and the marker are stationary.

(((3)))

The information processing apparatus according to (((2))), wherein the processor is configured to specify whether the document and the marker are stationary by using a captured image of an area where the document is to be placed.

(((4)))

The information processing apparatus according to any one of (((1))) to (((3))), wherein the processor is configured to present operating mode information indicating whether an operating mode is a first operating mode for registering the area information or a second operating mode for executing the processing.

(((5)))

The information processing apparatus according to (((4))), wherein if the first operating mode ends, the processor is configured to present information indicating to remove the marker from the document.

(((6)))

The information processing apparatus according to any one of (((1))) to (((5))), wherein content of the processing is specifiable from the marker.

(((7)))

The information processing apparatus according to (((6))), wherein the content of the processing is specifiable according to characteristics of an appearance of the marker.

(((8)))

The information processing apparatus according to (((7))), wherein the characteristics of the appearance are at least one of color, density, and shape.

(((9)))

The information processing apparatus according to any one of (((1))) to (((8))), wherein if a plurality of markers exist and a detection of a last marker is finished, the processor is configured to end an operating mode for registering the area information.

(((10)))

The information processing apparatus according to any one of (((1))) to (((9))), wherein the processing is processing using a document camera.

(((11)))

The information processing apparatus according to (((10))), wherein the processing using the document camera is processing related to image reading processing.

What is claimed is:

1. An information processing apparatus comprising:
a processor configured to:
capture an image of a document using an image camera;
determine whether an area to be processed in the document captured by the image camera is specified, the determination including:
firstly determining, with the image camera, whether a marker is placed on the surface of the document, the marker comprising machine-readable code;
when it is determined that the marker is not placed on the surface of the document, secondly determining whether area information indicating the area to be processed is registered;
when it is determined that both the marker is not placed on the surface of the document and the area information is not registered, thirdly determining whether the area information is registered after a predetermined area on the surface of the document is registered as a target; and
execute processing in response to at least one of the first determining, the second determining and the third determining being affirmative, and ending image capture without processing when each of the first, second and third determinings are negative.

2. The information processing apparatus according to claim 1, wherein the processor is configured to specify a presence or absence of a placement of the marker on the surface of the document if the document and the marker are stationary.

3. The information processing apparatus according to claim 2, wherein the processor is configured to specify whether the document and the marker are stationary by using a captured image of an area where the document is to be placed.

4. The information processing apparatus according to claim 1, wherein the processor is configured to present operating mode information indicating whether an operating mode is a first operating mode for registering the area information or a second operating mode for executing the processing.

5. The information processing apparatus according to claim 4, wherein if the first operating mode ends, the processor is configured to present information indicating to remove the marker from the document.

6. The information processing apparatus according to claim 1, wherein content of the processing is specifiable from the marker.

7. The information processing apparatus according to claim 6, wherein the content of the processing is specifiable according to characteristics of an appearance of the marker.

8. The information processing apparatus according to claim 7, wherein the characteristics of the appearance are at least one of color, density, and shape.

9. The information processing apparatus according to claim 1, wherein if a plurality of markers exist and a detection of a last marker is finished, the processor is configured to end an operating mode for registering the area information.

10. An information processing method comprising:
capturing an image of a document using an image camera;
determining whether an area to be processed in the document captured by the image camera is specified, the determination including:
firstly determining, with the image camera, whether a marker is placed on the surface of the document, the marker comprising machine-readable code;
when it is determined that the marker is not placed on the surface of the document, secondly determining whether area information indicating the area to be processed is registered;
when it is determined that both the marker is not placed on the surface of the document and the area information is not registered, thirdly determining whether the area information is registered after a predetermined area on the surface of the document is registered as a target; and
executing processing in response to at least one of the first determining, the second determining and the third determining being affirmative, and ending image capture without processing when each of the first, second and third determinings are negative.

11. A non-transitory computer readable medium storing a program causing a computer to execute a process comprising:
capturing an image of a document using an image camera;
determining whether an area to be processed in the document captured by the image camera is specified, the determination including:
firstly determining, with the image camera, whether a marker is placed on the surface of the document, the marker comprising machine-readable code;
when it is determined that the marker is not placed on the surface of the document, secondly determining whether area information indicating the area to be processed is registered;
when it is determined that both the marker is not placed on the surface of the document and the area information is not registered, thirdly determining whether the area information is registered after a predetermined area on the surface of the document is registered as a target; and
executing processing in response to at least one of the first determining, the second determining and the third determining being affirmative, and ending image capture without processing when each of the first, second and third determinings are negative.

* * * * *